United States Patent
Shapiro et al.

(10) Patent No.: US 11,433,477 B2
(45) Date of Patent: Sep. 6, 2022

(54) HOUSING FOR COMPUTER-NUMERICALLY-CONTROLLED MACHINE

(71) Applicant: Glowforge Inc., Seattle, WA (US)

(72) Inventors: Daniel Shapiro, Mercer Island, WA (US); Mark Gosselin, Seattle, WA (US); Anthony Wright, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 0 days.

(21) Appl. No.: 15/823,499

(22) Filed: Nov. 27, 2017

(65) Prior Publication Data

US 2018/0147657 A1 May 31, 2018

Related U.S. Application Data

(60) Provisional application No. 62/426,424, filed on Nov. 25, 2016.

(51) Int. Cl.
*B23K 26/00* (2014.01)
*B23K 26/12* (2014.01)
(Continued)

(52) U.S. Cl.
CPC ........ *B23K 26/0096* (2013.01); *B23K 26/032* (2013.01); *B23K 26/0648* (2013.01);
(Continued)

(58) Field of Classification Search
CPC ............................. B23K 26/706; B32B 27/144
See application file for complete search history.

(56) References Cited

U.S. PATENT DOCUMENTS

| | | |
|---|---|---|
| 3,721,811 A | 3/1973 | Taylor et al. |
| 3,967,176 A | 6/1976 | Wagener et al. |

(Continued)

FOREIGN PATENT DOCUMENTS

| | | |
|---|---|---|
| CN | 101095033 A | 12/2007 |
| CN | 101733558 A | 6/2010 |

(Continued)

OTHER PUBLICATIONS

Dazhong Wu et al. "Cloud Manufacturing: Drivers, Current Status, and Future Trends." vol. 2. Systems; Micro And Nano Technologies Sustainable Manufacturing. Jun. 10, 2013. Retrieved on May 10, 2016. pp. 1-10.

(Continued)

*Primary Examiner* — George R Koch
*Assistant Examiner* — Christopher C Caillouet
(74) *Attorney, Agent, or Firm* — Lee Sullivan Shea & Smith LLP

(57) ABSTRACT

A computer-numerically-controlled machine can include a light source and a housing. The light source can be configured to deliver electromagnetic energy to at least one location on a material at least partially disposed within the computer-numerically-controlled machine. The housing can include at least one side part surrounding an interior space and the at least one location on the material. The housing can include a structural material defining at least a portion of the interior space. The housing can further include a protective material protecting the side part. The protective material can reduce a permeability of the side part to the electromagnetic radiation relative to the structural material alone.

20 Claims, 8 Drawing Sheets

(51) Int. Cl.
  *B23K 26/70* (2014.01)
  *B23K 26/03* (2006.01)
  *B23K 26/06* (2014.01)
  *B32B 37/02* (2006.01)
  *B32B 37/12* (2006.01)
  *B32B 37/14* (2006.01)
  *B23K 26/08* (2014.01)
  *B23K 26/38* (2014.01)
  *B23K 37/02* (2006.01)

(52) U.S. Cl.
  CPC .......... *B23K 26/127* (2013.01); *B23K 26/706* (2015.10); *B32B 37/02* (2013.01); *B32B 37/12* (2013.01); *B32B 37/144* (2013.01); *B23K 26/0892* (2013.01); *B23K 26/38* (2013.01); *B23K 26/705* (2015.10); *B23K 37/0288* (2013.01)

(56) References Cited

U.S. PATENT DOCUMENTS

| | | |
|---|---|---|
| 4,055,787 A | 10/1977 | Beadle et al. |
| 4,138,718 A | 2/1979 | Toke et al. |
| 4,383,762 A | 5/1983 | Burkert |
| 4,518,843 A | 5/1985 | Antol et al. |
| 4,650,287 A | 3/1987 | Kudo et al. |
| 4,723,219 A | 2/1988 | Beyer et al. |
| 4,863,538 A | 9/1989 | Deckard |
| 4,894,831 A | 1/1990 | Alfrey |
| 4,901,359 A | 2/1990 | Bruder |
| 4,918,611 A | 4/1990 | Shyu et al. |
| 5,298,843 A | 3/1994 | Miyajima et al. |
| 5,355,250 A | 10/1994 | Grasso et al. |
| 5,396,279 A | 3/1995 | Vossen |
| 5,475,521 A | 12/1995 | Heidemann |
| 5,585,018 A | 12/1996 | Kanaoka et al. |
| 5,682,319 A | 10/1997 | Boland et al. |
| 5,756,961 A | 5/1998 | Sato et al. |
| 6,031,200 A | 2/2000 | Whitehouse |
| 6,085,122 A | 7/2000 | Manning |
| 6,087,625 A | 7/2000 | Iso |
| 6,284,999 B1 | 9/2001 | Virtanen et al. |
| 6,420,674 B1 | 7/2002 | Cole, III et al. |
| 6,420,675 B1 | 7/2002 | Lizotte et al. |
| 6,498,653 B1 | 12/2002 | Wang |
| 6,528,758 B2 | 3/2003 | Shaffer |
| 6,609,044 B1 | 8/2003 | Basista et al. |
| 6,628,322 B1 | 9/2003 | Cerruti |
| 6,696,667 B1 | 2/2004 | Flanagan |
| 7,005,606 B2 | 2/2006 | Legge et al. |
| 7,456,372 B2 | 11/2008 | Hiramatsu |
| 8,111,904 B2 | 2/2012 | Wallack et al. |
| 8,136,432 B2 | 3/2012 | Travez et al. |
| 8,786,928 B2 | 7/2014 | Dolleris et al. |
| 8,809,780 B2 | 8/2014 | Wollenhaupt et al. |
| 8,921,734 B2 | 12/2014 | Yerazunis et al. |
| 9,020,628 B2 | 4/2015 | Fagan |
| 9,235,205 B2 | 1/2016 | Prestidge et al. |
| 9,469,338 B2 | 10/2016 | Norberg Ohlsson |
| 9,618,926 B1 | 4/2017 | Louette et al. |
| 9,734,419 B1 | 8/2017 | Ye et al. |
| 9,772,067 B2 * | 9/2017 | Bunz .................... F16P 3/02 |
| 9,782,906 B1 | 10/2017 | Aminpour et al. |
| 9,912,915 B2 | 3/2018 | Sinclair |
| 9,987,798 B2 | 6/2018 | Tyler |
| 10,234,260 B2 | 3/2019 | Siercks et al. |
| 10,642,251 B2 | 5/2020 | Platts et al. |
| 2001/0012973 A1 | 8/2001 | Wehrli et al. |
| 2002/0129485 A1 | 9/2002 | Mok et al. |
| 2002/0144987 A1 | 10/2002 | Tomlinson et al. |
| 2003/0049373 A1 | 3/2003 | Van De Rijdt et al. |
| 2004/0029493 A1 | 2/2004 | Tricard et al. |
| 2004/0207831 A1 | 10/2004 | Aoyama |
| 2004/0223165 A1 | 11/2004 | Kurokawa et al. |
| 2004/0245227 A1 | 12/2004 | Grafton-Reed et al. |
| 2005/0051523 A1 | 3/2005 | Legge et al. |
| 2005/0069682 A1 | 3/2005 | Tseng |
| 2005/0071020 A1 | 3/2005 | Yamazaki et al. |
| 2005/0115941 A1 * | 6/2005 | Sukhman ................ B32B 15/08 |
| | | 219/121.86 |
| 2005/0142701 A1 | 6/2005 | Yamaguchi et al. |
| 2005/0187651 A1 | 8/2005 | Kimura et al. |
| 2006/0043615 A1 | 3/2006 | Zheng et al. |
| 2007/0000889 A1 | 1/2007 | Yamazaki et al. |
| 2007/0032733 A1 | 2/2007 | Burton |
| 2007/0034615 A1 | 2/2007 | Kleine |
| 2007/0181544 A1 | 8/2007 | Sukhman et al. |
| 2008/0058734 A1 | 3/2008 | Hanft et al. |
| 2008/0100829 A1 | 5/2008 | Watson |
| 2008/0101687 A1 | 5/2008 | Goeller |
| 2008/0149604 A1 | 6/2008 | Varriano-Marston et al. |
| 2008/0160254 A1 | 7/2008 | Arnold |
| 2008/0243299 A1 | 10/2008 | Johnson et al. |
| 2008/0249653 A1 | 10/2008 | Ichikawa |
| 2009/0120914 A1 | 5/2009 | Lawrence |
| 2009/0250445 A1 | 10/2009 | Yamaguchi et al. |
| 2009/0308851 A1 | 12/2009 | Hamisch et al. |
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0274379 A1 | 10/2010 | Hehl |
| 2010/0292947 A1 | 11/2010 | Buk |
| 2010/0301023 A1 | 12/2010 | Unrath et al. |
| 2010/0326962 A1 | 12/2010 | Calla et al. |
| 2011/0005458 A1 | 1/2011 | Cunningham |
| 2011/0080476 A1 | 4/2011 | Dinauer et al. |
| 2011/0127333 A1 | 6/2011 | Veksland et al. |
| 2011/0135208 A1 | 6/2011 | Atanassov et al. |
| 2011/0193943 A1 | 8/2011 | Campbell |
| 2011/0286007 A1 | 11/2011 | Pangrazio et al. |
| 2011/0316977 A1 * | 12/2011 | Pienaar ............... G05B 19/4068 |
| | | 348/46 |
| 2012/0026249 A1 | 2/2012 | Kihira et al. |
| 2012/0035745 A1 | 2/2012 | Mori et al. |
| 2012/0117787 A1 | 5/2012 | Sun et al. |
| 2012/0120232 A1 | 5/2012 | Nishikawa |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1 | 7/2013 | Shilpiekandula et al. |
| 2013/0200053 A1 | 8/2013 | Bordatchev |
| 2013/0211391 A1 | 8/2013 | BenYakar et al. |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0039707 A1 | 2/2014 | Curtis et al. |
| 2014/0046131 A1 | 2/2014 | Morita et al. |
| 2014/0071330 A1 | 3/2014 | Zhang et al. |
| 2014/0071502 A1 | 3/2014 | Liu |
| 2014/0160273 A1 | 6/2014 | Jedynak et al. |
| 2014/0268607 A1 | 9/2014 | Wicker et al. |
| 2014/0299586 A1 | 10/2014 | Sawabe et al. |
| 2014/0310122 A1 | 10/2014 | Danielson et al. |
| 2014/0330424 A1 | 11/2014 | Garaas et al. |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0136949 A1 | 5/2015 | De Nooij et al. |
| 2015/0154453 A1 | 6/2015 | Wilf |
| 2015/0158121 A1 | 6/2015 | Di Cairano et al. |
| 2015/0158311 A1 | 6/2015 | Ogasawara et al. |
| 2015/0197064 A1 | 7/2015 | Walker et al. |
| 2015/0212421 A1 | 7/2015 | deVilliers et al. |
| 2015/0228069 A1 | 8/2015 | Fresquet et al. |
| 2015/0245549 A1 | 8/2015 | Kurita et al. |
| 2015/0301327 A1 | 10/2015 | Okugawa et al. |
| 2015/0355621 A1 | 12/2015 | Ikeda et al. |
| 2015/0360318 A1 | 12/2015 | Aubry |

(56) References Cited

U.S. PATENT DOCUMENTS

| | | |
|---|---|---|
| 2015/0378348 A1 | 12/2015 | Gupta et al. |
| 2016/0059371 A1 | 3/2016 | Chang et al. |
| 2016/0084649 A1 | 3/2016 | Yamazaki et al. |
| 2016/0093540 A1 | 3/2016 | Liu et al. |
| 2016/0147213 A1 | 5/2016 | Murakami |
| 2016/0156771 A1 | 6/2016 | Lee |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0349038 A1 | 12/2016 | Ohtsuka et al. |
| 2016/0360409 A1 | 12/2016 | Singh |
| 2016/0372349 A1 | 12/2016 | Hyakumura |
| 2017/0008127 A1 | 1/2017 | Hyatt et al. |
| 2017/0045877 A1 | 2/2017 | Shapiro et al. |
| 2017/0045879 A1 | 2/2017 | Yang et al. |
| 2017/0057008 A1 | 3/2017 | Liu et al. |
| 2017/0123362 A1 | 5/2017 | Masui et al. |
| 2017/0203390 A1 | 7/2017 | Kato |
| 2017/0235293 A1 | 8/2017 | Shapiro et al. |
| 2017/0235294 A1 | 8/2017 | Shapiro et al. |
| 2017/0243374 A1 | 8/2017 | Matsuzawa |
| 2017/0341183 A1 | 11/2017 | Buller et al. |
| 2018/0001565 A1 | 1/2018 | Hocker |
| 2018/0113434 A1 | 4/2018 | Shapiro et al. |
| 2018/0147658 A1 | 5/2018 | Shapiro |
| 2018/0147659 A1 | 5/2018 | Shapiro |
| 2018/0150047 A1 | 5/2018 | Shapiro |
| 2018/0150055 A1 | 5/2018 | Shapiro |
| 2018/0150058 A1 | 5/2018 | Shapiro |
| 2018/0150062 A1 | 5/2018 | Shapiro |
| 2019/0014307 A1 | 1/2019 | McNamer et al. |
| 2019/0058870 A1 | 2/2019 | Rowell et al. |
| 2019/0148028 A1 | 5/2019 | Ravenhall et al. |
| 2019/0278250 A1 | 9/2019 | Clement et al. |
| 2019/0310604 A1 | 10/2019 | Shapiro et al. |
| 2020/0039002 A1 | 2/2020 | Sercel et al. |
| 2020/0064806 A1 | 2/2020 | Shapiro et al. |
| 2020/0073362 A1 | 3/2020 | Shapiro et al. |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |
| 2020/0192332 A1 | 6/2020 | Jacobs et al. |

FOREIGN PATENT DOCUMENTS

| | | |
|---|---|---|
| CN | 101837517 A | 9/2010 |
| CN | 205958834 U | 2/2017 |
| CN | 106670656 A | 5/2017 |
| DE | 10 2014 214058 A1 | 1/2016 |
| EP | 0954125 A2 | 11/1999 |
| EP | 1309108 A1 | 5/2003 |
| EP | 2471625 A2 | 7/2012 |
| EP | 2808123 A1 | 12/2014 |
| FR | 2748562 A1 | 11/1997 |
| JP | H03 254380 A | 11/1991 |
| JP | 04244347 A | 9/1992 |
| JP | H05-205051 A | 8/1993 |
| JP | 2001-330413 A | 11/2001 |
| JP | 2002123306 A | 4/2002 |
| JP | 2006-329751 A | 12/2006 |
| JP | 2008-119718 A | 5/2008 |
| WO | WO-94/03302 A1 | 2/1994 |
| WO | WO-96/23240 A1 | 8/1996 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Gao, Rong et al. "Human-Machine Collaborative Workshop Digital Manufacturing." *ICICTA. 2010 IEEE*. May 11, 2010. pp. 445-448.

International Search Report and Written Opinion issued in International Application No. PCT/US2017/063187, dated Apr. 3, 2018 (Apr. 3, 2018). 11 pages.

Examination Report issued in European Patent Application No. 16709185.9, dated Jul. 1, 2020 (Jul. 1, 2020). 5 pages.

First Office Action issued in Chinese Patent Application No. 201680021337.8, dated Apr. 10, 2019. 6 pages. [Chinese language].

First Office Action issued in Chinese Patent Application No. 201680021337.8, dated Apr. 10, 2019. 8 pages. [English language translation].

Inmagine Group. Vectr Free Online Vector Graphics Software. Retrieved Mar. 22, 2021, from https://vectr.com/. 3 pages.

International Search Report and Written Opinion issued in International Application No. PCT/US2016/017900, dated May 27, 2016. 16 pages.

International Search Report and Written Opinion issued in International Application No. PCT/US2016/017901, dated Jun. 3, 2016 (Jun. 3, 2016). 13 pages.

International Search Report and Written Opinion issued in International Application No. PCT/US2016/017903, dated Jun. 1, 2016. 15 pages.

International Search Report and Written Opinion issued in International Application No. PCT/US2016/017904, dated May 23, 2016. (May 23, 2016). 19 pages.

International Search Report and Written Opinion issued in International Application No. PCT/US2017/063188, dated Feb. 16, 2018 (Feb. 16, 2018). 14 pages.

International Search Report and Written Opinion issued in International Application No. PCT/US2017/063189, dated May 2, 2018 (May 2, 2018). 22 pages.

International Search Report and Written Opinion issued in International Application No. PCT/US2017/063190, dated May 3, 2018 (May 3, 2018). 18 pages.

International Search Report and Written Opinion issued in International Application No. PCT/US2017/063191, dated Mar. 21, 2018 (Mar. 21, 2018). 12 pages.

International Search Report and Written Opinion issued in International Application No. PCT/US2017/063192, dated Apr. 19, 2018 (Apr. 19, 2018). 12 pages.

International Search Report and Written Opinion issued in International Application No. PCT/US2017/063193, dated Feb. 16, 2018 (Feb. 16, 2018). 12 pages.

Second Office Action issued in Chinese Patent Application No. 201680021337.8, dated Nov. 4, 2019. 3 pages. [Chinese language].

Second Office Action issued in Chinese Patent Application No. 201680021337.8, dated Nov. 4, 2019. 4 pages. [English language translation].

Third Office Action issued in Chinese Patent Application No. 201680021337.8, dated Jul. 23, 2020. 11 pages. [Chinese language].

Third Office Action issued in Chinese Patent Application No. 201680021337.8, dated Jul. 23, 2020. 20 pages. [English language translation].

\* cited by examiner

HOUSING FOR COMPUTER-NUMERICALLY-CONTROLLED MACHINE

CROSS REFERENCE TO RELATED APPLICATION

This application claims priority to U.S. Provisional Application No. 62/426,424 filed on Nov. 25, 2016 and entitled LASER CUTTER HOUSING, the disclosure of which is incorporated herein by reference in its entirety.

TECHNICAL FIELD

The subject matter described herein relates to systems and methods for providing a housing having at least side parts and/or bottom parts made substantially of plastic to encase a computer-numerically-controlled machine with an added material layer providing improved confinement of laser energy.

BACKGROUND

A computer-numerically-controlled (CNC) machine can operate by moving a tool over a material to be machined. The tool can be a light source such as, for example, a laser and/or the like, that is configured to deliver electromagnetic energy to one or more locations along the material.

SUMMARY

In one aspect, a computer-numerically-controlled machine includes a light source configured to deliver electromagnetic energy at a location on a material at least partially disposed within the computer-numerically-controlled machine. A housing surrounds the sides and, optionally, the bottom of an interior space and the location. The housing includes a structural material defining at least a portion of the interior space. The housing also has a protective material protecting the plastic at least on the side parts (also referred to as sides) and/or bottom parts (also referred to as the bottom). The protective material can, among other possible benefits, dissipate, absorb, and/or scatter electromagnetic energy emitted by the laser to prevent the electromagnetic energy from escaping the housing. The dissipating, scattering, and/or absorbing has the effect of reducing a permeability of the housing to electromagnetic energy relative to the structural material alone (e.g. without the protective material).

Implementations of the current subject matter can provide one or more advantages, such as for example providing improved safety for operators of a CNC machine and/or preventing or reducing the potential for material damage due to electromagnetic energy escaping from the housing. A housing as described herein provides benefits in manufacturing cost savings, resiliency, durability, and the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to systems and methods for surface feature production in a CNC machine, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Computer-numerically-controlled machines can direct energy at a material for the purpose of effecting a change in the material. In particular, laser cutters/engravers direct electromagnetic energy (a laser beam) to a material in order to cut or engrave it. The laser energy can be absorbed by the material which discolors, ablates, burns, melts, vaporizes, etc., to form holes, cuts, engravings, and the like. The laser energy can also cause the material to harden, cause a phase transition, or otherwise modify the physical characteristics of the material. The laser beam can be focused so that a maximum power density is achieved at the material.

Under normal circumstances, the laser will encounter either the material or the material on which the laser is resting. This can be a metal grating, allowing the bulk of the laser energy to pass through, with some additional structure that can resist the laser underneath the grating, for example, a metal plate. A grating can be used because if the material being affected rested on solid metal, the reflection of the beam could strike the back side of the material and cause unwanted effects. By the time the beam reaches the bottom of the grating, having passed its focal point, the beam will have already widened so the power density will have decreased.

However, there are circumstances that could cause the laser radiation to be diverted away from the material and what is underneath it. One cause can be a material that reflects laser radiation, for example copper for a carbon dioxide laser. Another cause could be that some form of damage to the laser cutter/engraver that causes the beam to move in an unexpected direction, for example a mirror that was intended to redirect the beam safely getting bumped out of alignment.

A person outside of the CNC machine could be injured if that person encountered laser radiation. For that reason, a number of government agencies regulate lasers to ensure that laser radiation is contained, for example, in the United States, the Center for Devices and Radiological Health, which is a branch of the Food and Drug Association. To aid in the containment of laser radiation, structures and materials can be incorporated into the housing of the CNC machine to further reduce the risk of unwanted laser reflections or burn-through.

Figure 1:
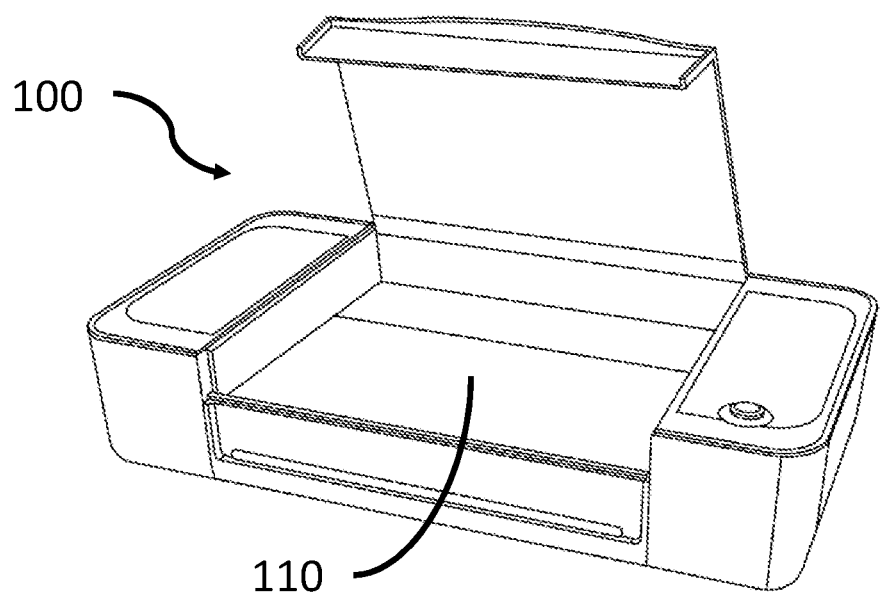
FIG. 1 is a perspective view of a housing of a CNC machine, consistent with some implementations of the current subject matter.
Figure 2:
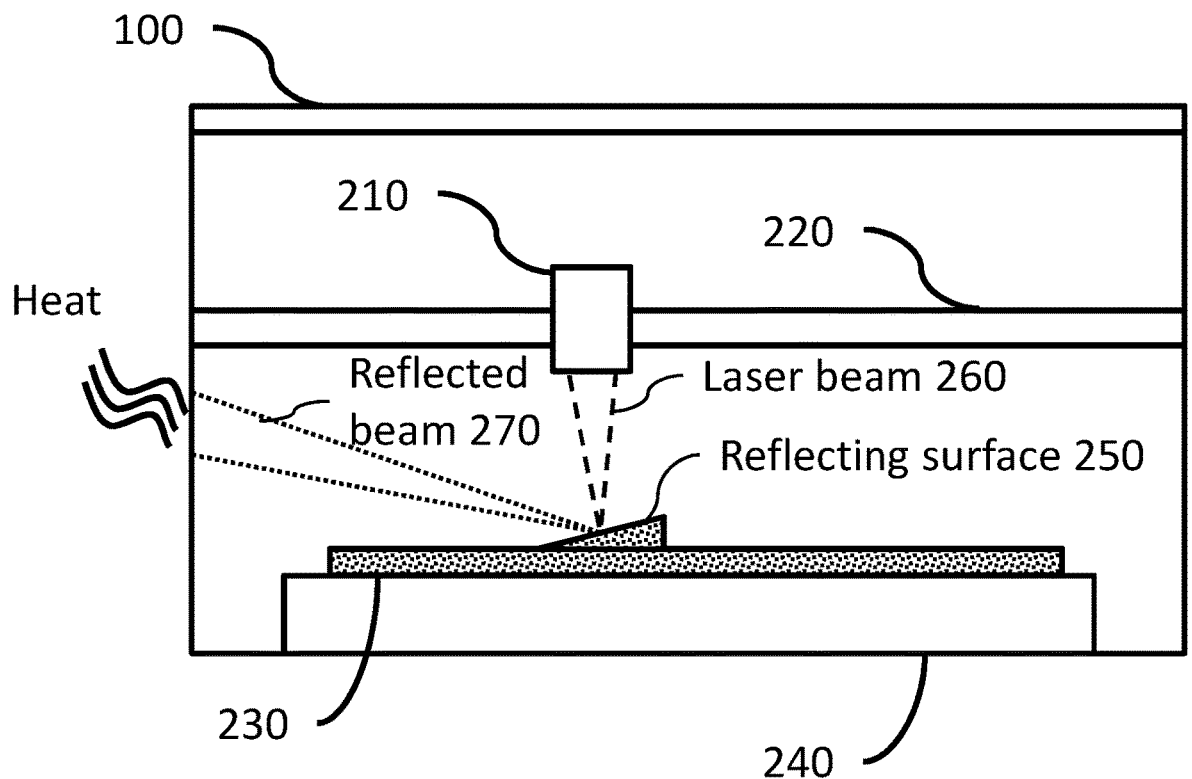
FIG. 2 is a diagram illustrating the absorption of laser radiation by the housing, consistent with some implementations of the current subject matter.
Figure 3:
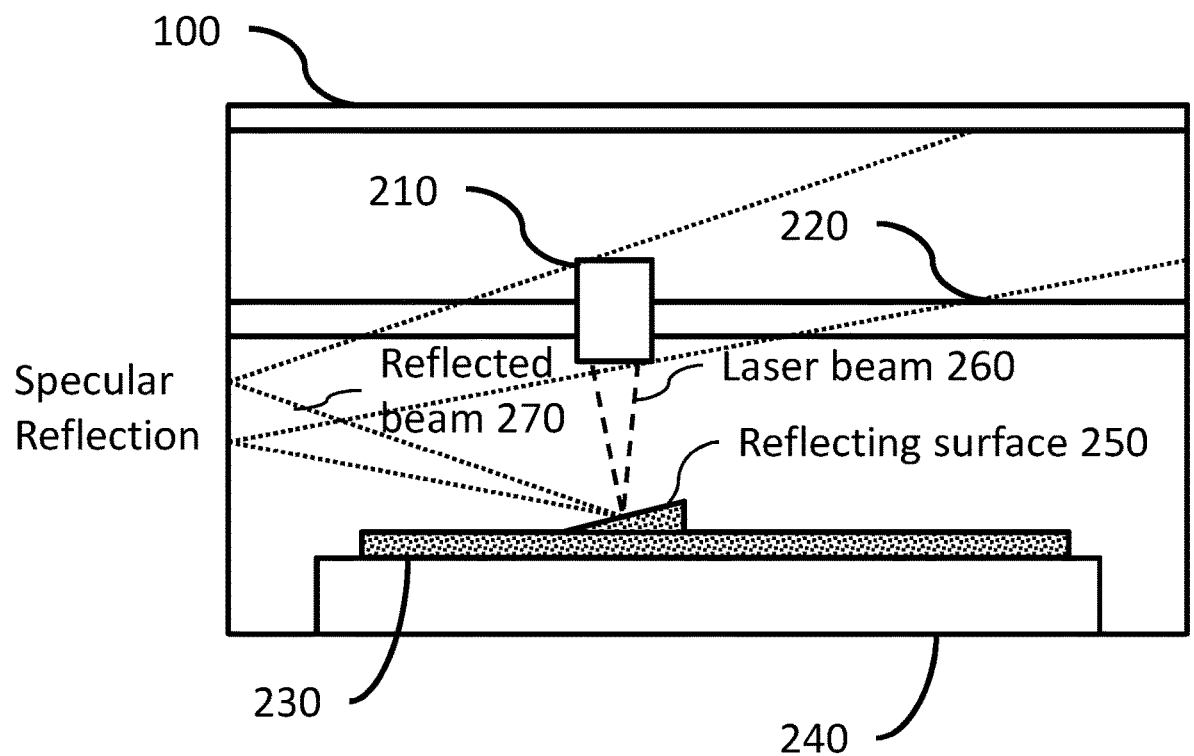
FIG. 3 is a diagram illustrating the specular reflection of laser radiation by the housing, consistent with some implementations of the current subject matter.
Figure 4:
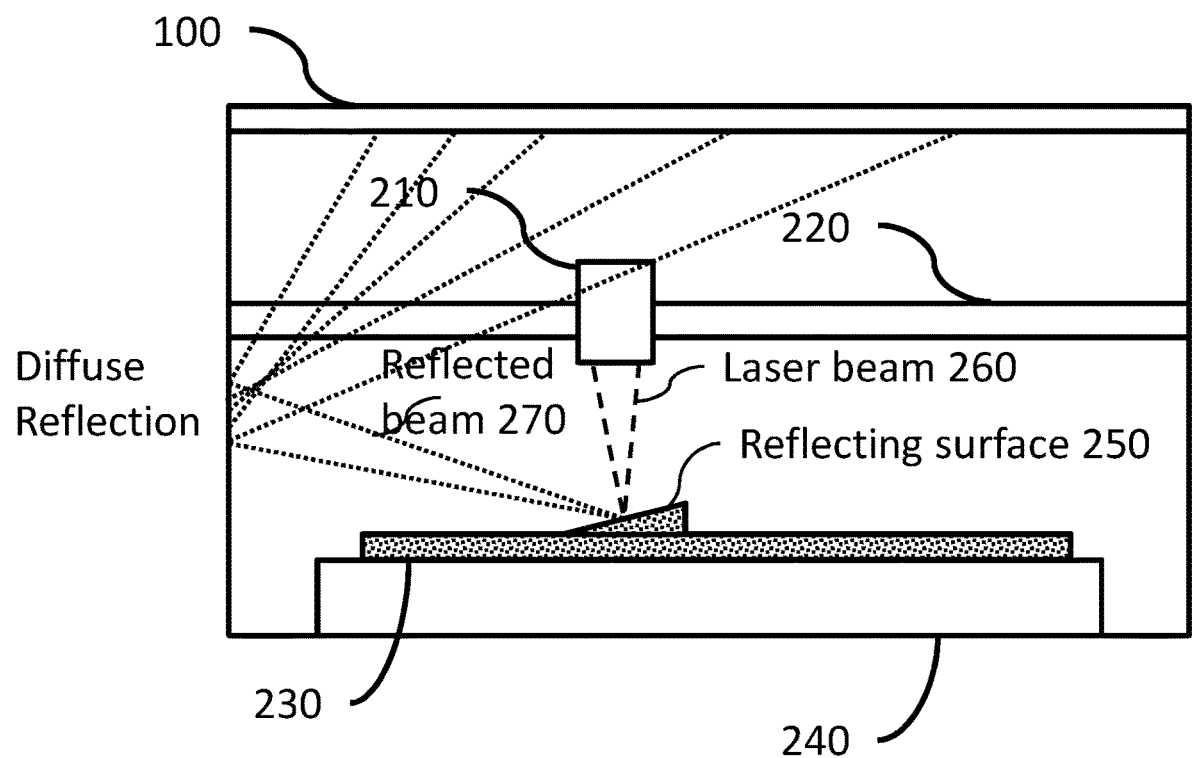
FIG. 4 is a diagram illustrating the diffuse reflection of laser radiation by the housing, consistent with some implementations of the current subject matter.

FIG. 1 is a perspective view of a housing 100 of a CNC machine. FIG. 2 is a diagram illustrating the absorption of laser radiation by a housing. FIG. 3 is a diagram illustrating the specular reflection of laser radiation by the housing. FIG. 4 is a diagram illustrating the diffuse reflection of laser radiation by the housing. The dashed lines indicating focusing of the laser beam are shown in an exaggerated manner for illustrative purposes. Lasers are often used with housings, which can serve several purposes. First, housings can provide an aesthetic appearance to the device that is desirable. Second, housings can provide structural rigidity and support for interior components of the CNC machine. Third, housings can contain the laser radiation.

CNC Machine Housing

The CNC machine can include a housing with an interior space 110 where the laser beam 260 can operate on the material 230. Though shown as open in FIG. 1, to illustrate the interior space, the housing can also be configured to restrict the laser beam to the interior space. For example, the housing can include closable apertures, laser-opaque windows, and the like such that typically no harmful laser light can escape. As shown in FIGS. 2-4, the housing can, for example, surround the laser, the material, and other components such as the laser head, gantry, turning optics, the support 240, and the like. In the event that a reflecting surface 250 is present that would cause an undesirable amount of laser light to be reflected from the material, the housing contains the reflecting laser light 270. The reflective surface can be, for example, an imperfection on the material, a result of a prior cut or engraving, a natural contour or feature of the material, a foreign object or debris, etc.

Laser radiation can be contained through several basic strategies, some of which are described herein. First, as shown in FIG. 2, laser radiation can be absorbed. In order to absorb the energy, the material must be absorptive at the wavelength of the radiation, and must not vaporize, melt, or otherwise change in such a way as to stop absorbing the material. Second, as shown in FIG. 2, it can be reflected. In some cases, reflection can redirect the energy towards another area capable of absorbing the radiation. Because laser cutter/engravers sometimes pass the beam through a focusing lens, reflecting the beam (after the beam's focal point) may give it more room to spread out and thus reduce the power density, making it easier to absorb without damage. Third, as shown in FIG. 4, the beam can be diffusely reflected. This may not only redirect the energy, but also can reduce the beam power density by spreading the beam out even more quickly.

In some implementations, the structural material of the housing can serve all three purposes, structural, aesthetic, and radiation blocking, for example by fabricating the housing entirely from heavy sheet metal. However, in other implementations, the housing can advantageously be constructed of a structural material that is light, attractive, and/or inexpensive (but possibly not fully resistant to electromagnetic radiation from the laser), but which incorporates a protective material in the design that renders the housing safe against laser radiation. The protective material can be more resistant to the electromagnetic energy than the housing and thus render the housing safe against laser radiation.

One advantage of the composite construction is a smaller amount of laser-safe protective material can be used, with the remainder of the cheaper or lighter structural material used to provide structure or support for the rest of the CNC machine. The protective material can be applied to the housing at any place which could, in theory, receive laser light, for example reflections from the material being worked or from secondary reflections from other locations.

Internal Protective Material

Figure 5:
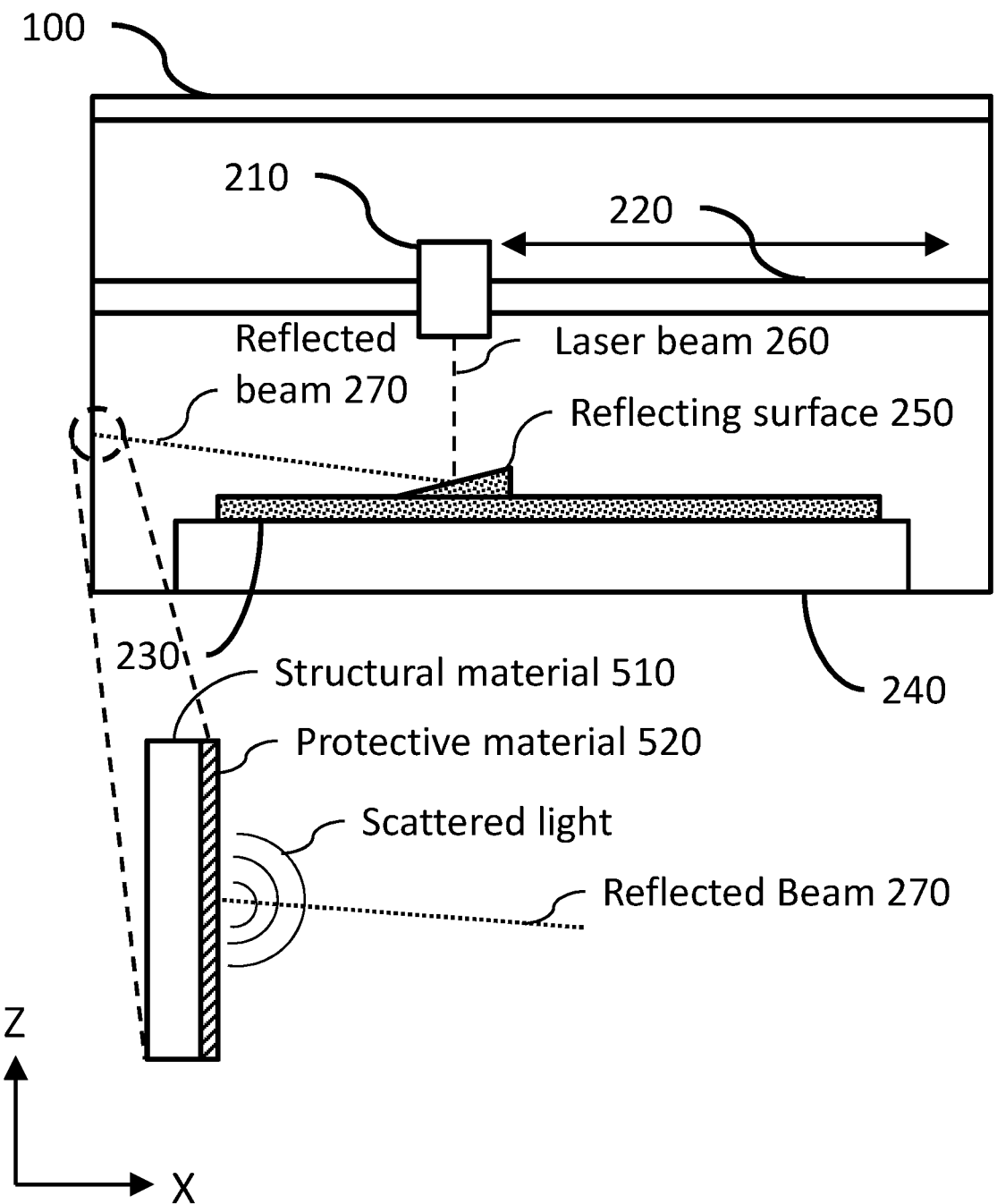
FIG. 5 is a diagram illustrating an expanded sectional view of the housing with an interior protective material, consistent with some implementations of the current subject matter.

FIG. 5 is a diagram illustrating an expanded sectional view of a housing with an interior protective material. The housing can, for example, be a single layer or composition of plastic or plastic doped with glass fiber. In some implementations, the housing can be of a composite construction. Here, the housing can be a composite of a structural material 510 and a protective material 520. The structural material can, for example, provide the primary mechanical support to the components of the CNC machine. Meanwhile, the protective material can be more resistant to electromagnetic energy (e.g., laser energy) than the structural material. As such, the protective material can be incorporated with the housing to dissipate, absorb, and/or scatter the electromagnetic energy (e.g., laser energy), thereby preventing the electromagnetic energy from escaping the housing. The dissipating, scattering, and/or absorbing has the effect of reducing a permeability of the housing to electromagnetic energy relative to the structural material alone (e.g. without the protective material).

In some implementations, the housing, which can include for example a top, sides, bottom, internal walls, or other structural components, can be constructed substantially of a material different than that of the protective material. In some implementations, the housing can be substantially constructed of polymers, commonly referred to in the art as plastics. As used herein, the term "substantially" in the context of the construction of the housing means that the case is for the most part, but not necessarily entirely, plastic. For example, one implementation of a housing can have a plastic shell with glass windows added to the sides, ports with metal mesh to protect fans, electrical feedthroughs, or the like. While implementations and designs of the housing can vary, the housing can generally refer to any combination of structural components or structures to which are added other components of the CNC machine (e.g. the laser, air filters, a material bed, etc.). In other implementations, "substantially" can refer to a housing being greater than 50% plastic in terms of interior surface area, exterior surface area, total surface area, mass density, cross sectional dimension, or the like. Because the top surface and lid of the case have different material requirements, such as a desire to be able to see through the lid, they are typically made of a different material than the rest of the case (e.g. glass) and so, while it may also be fabricated using the techniques shown here, are not included in the consideration of whether the case is substantially plastic.

While some implementations contemplate a housing constructed substantially of plastic incorporating a protective material, in other implementations specific or smaller portions of the housing can incorporate the protective material, or a different type of protective material. For example, in a location where the housing is especially thin, additional protective material can be applied to obtain the desired level of resistance to laser energy. Also, in implementations where the housing does not need protective material everywhere, then protective material can be added to the portions of the housing that can benefit from it. These portions can be, for example, plastic, wood, or the like. In such implementations, the housing is not substantially made of plastic. Also, in implementations where the need for protective material depends on the use or application of the CNC machine, the protective material may be added or removed to meet situational safety requirements. For example, a CNC machine capable of processing large or over-sized materials via the use of a material pass-through slot may employ the use of a detachable and/or semi-detachable protective material to increase the safety of use of the CNC machine when the material pass-through slot is not in use.

External Protective Material

Figure 6:
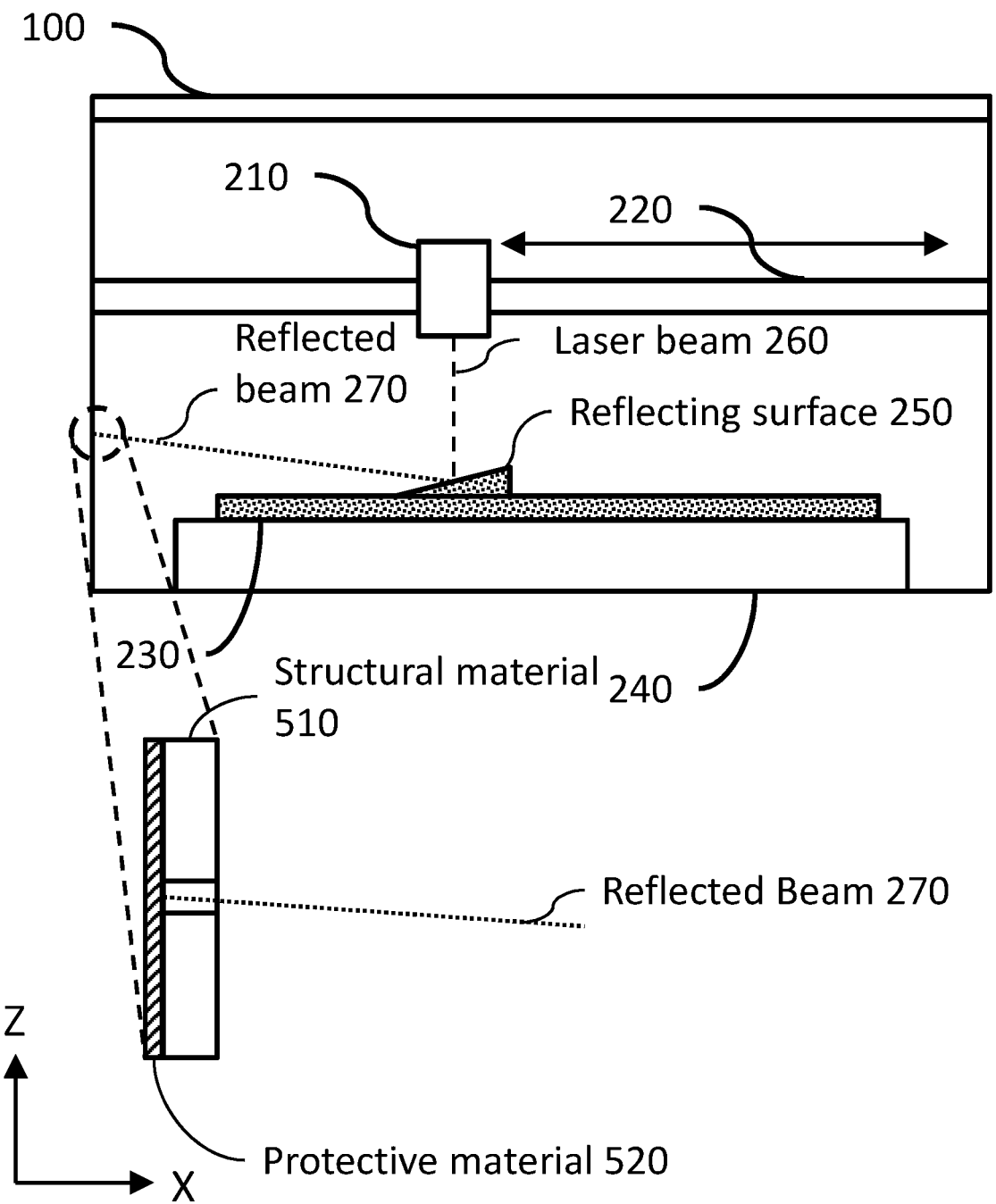
FIG. 6 is a diagram illustrating an expanded sectional view of the housing with an exterior protective material, consistent with some implementations of the current subject matter.

FIG. 6 is a diagram illustrating an expanded sectional view of the housing with an exterior protective material. In some situations, it may not be feasible to place the protective material on the inside of the housing. In some implementations, such as that shown in FIG. 6, the protective material can be on an external surface of the housing. As shown by the expanded view, a reflected laser beam can burn through the structural material but be stopped when reaching the protective material. Any implementations of the protective material described herein can be added to the exterior of the housing in such a manner. As with the internal protective material, an external protective material can have the effect of dissipating, scattering, and/or absorbing electromagnetic energy to thereby reduce a permeability of the plastic housing to electromagnetic energy relative to the structural material alone (e.g. without the protective material).

Figure 7:
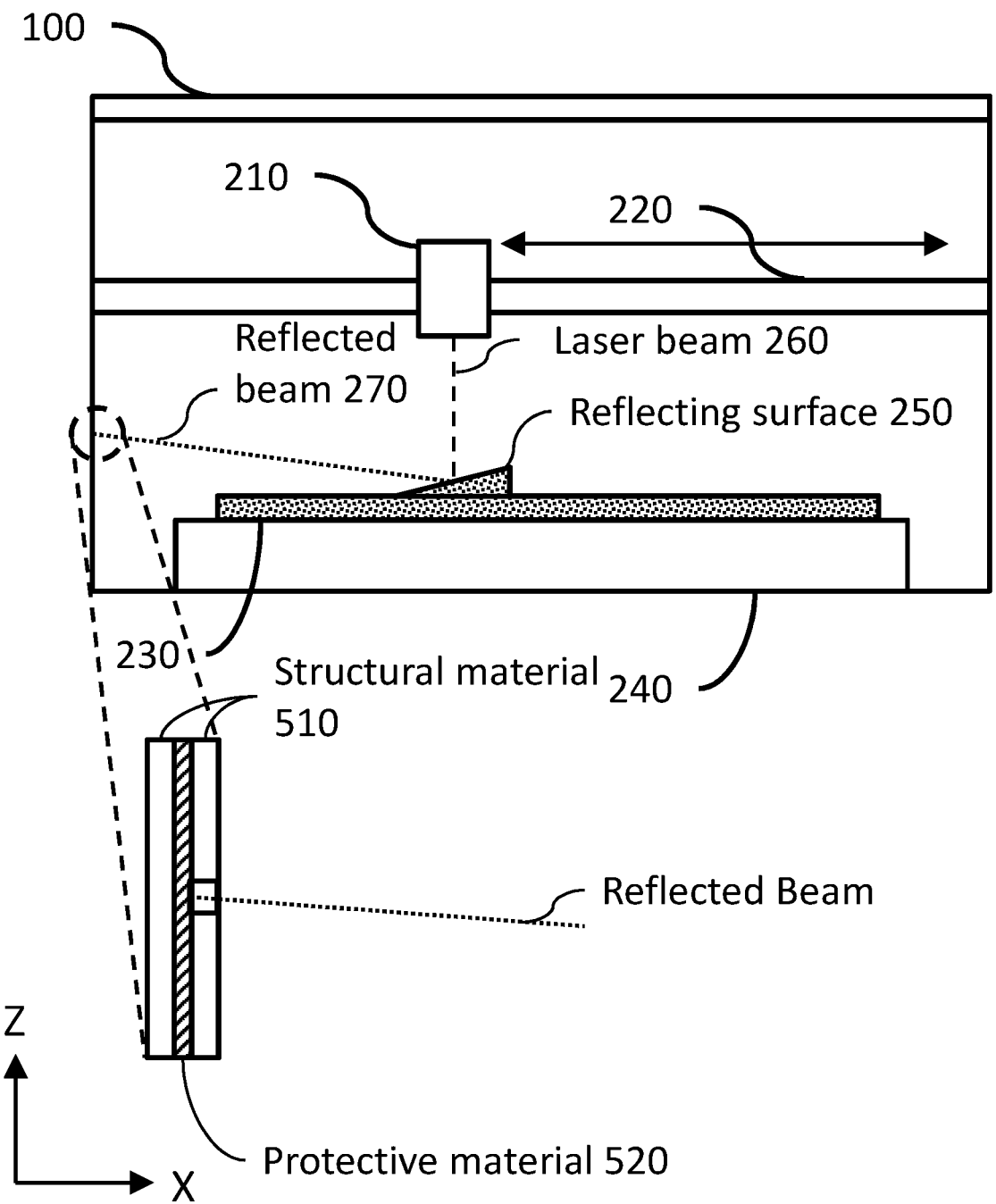
FIG. 7 is a diagram illustrating an expanded sectional view of the housing with protective material between an external structural material and an internal structural material, consistent with some implementations of the current subject matter.

FIG. 7 is a diagram illustrating an expanded sectional view of the housing with protective material between an external structural material and an internal structural material. The protective material, in some implementations, can be bracketed on either side by structural material. This can be done to conceal the protective material or to provide yet another layer to aid in confinement of the laser energy. The protective material can be co-molded with the structural material. That is, one side, either the interior or the exterior of the structural material can be molded. Then, the protective material can be molded to the existing structural material. Finally, another molding of structural material can be applied opposite the existing structural material such that the protective material is between the two structural materials. The structural materials can be the same type of structural material or they can be different types. Any combination of structural materials can be used, for example, plastic, wood, metal, etc. There can also be any number of layers of protective and/or structural materials. As shown in FIG. 7, a reflected beam 270 can strike the structural material and, for example, burn through one layer of structural material 510 before being stopped by the protective material.

Figure 8:
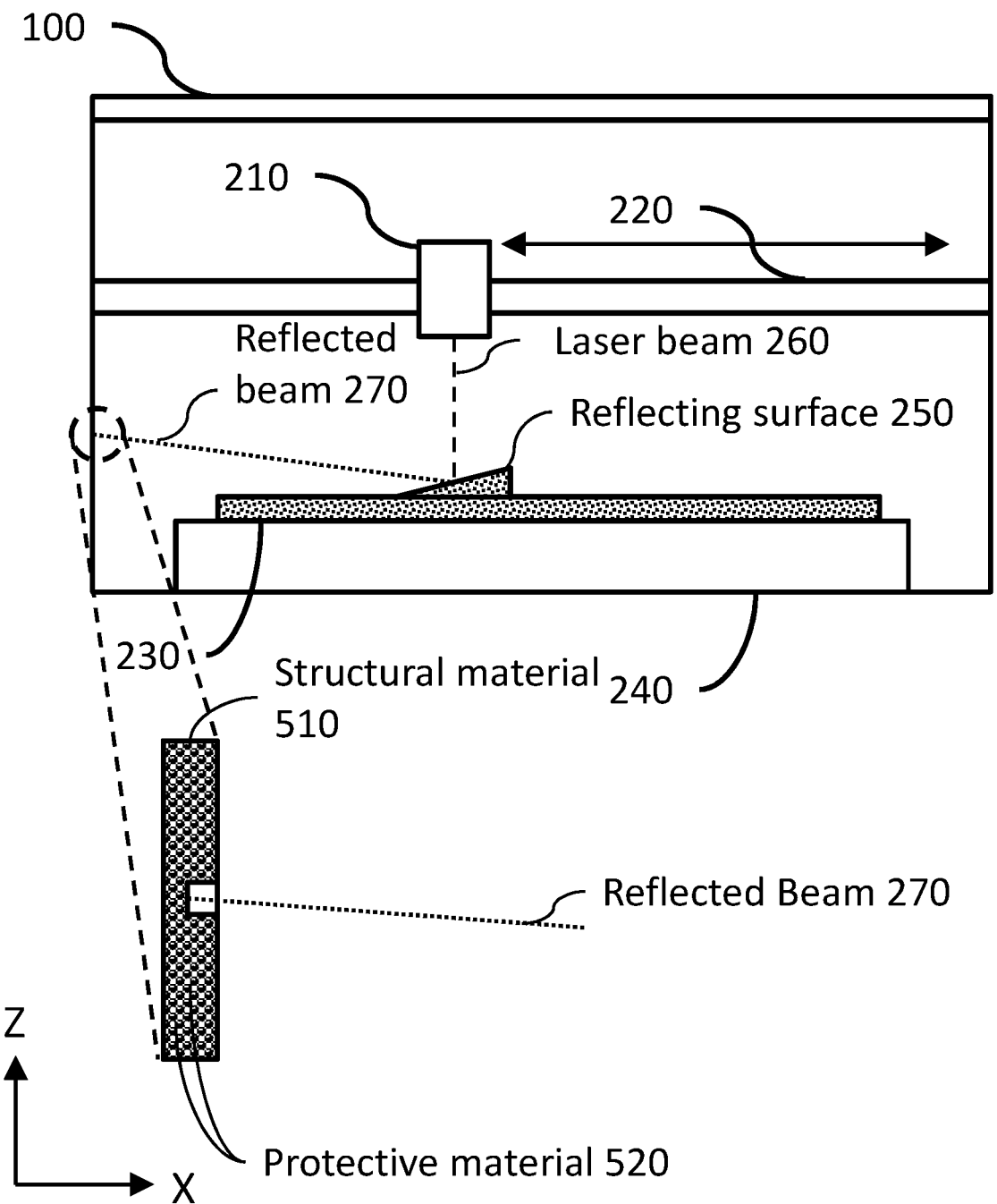
FIG. 8 is a diagram illustrating an expanded sectional view of the housing with protective material within a structural material, consistent with some implementations of the current subject matter.

FIG. 8 is a diagram illustrating an expanded sectional view of the housing with protective material within a structural material. In some implementations, the protective material can be dispersed throughout at least some of the structural material. The protective material can be an additive to the structural material that can, for example, be introduced during the molding of the structural material. The protective material, present within the structural material, can prevent the laser energy from completely penetrating the structural material. Some examples of protective material that can be placed within the structural material can include, for example, metal or ceramic fibers, spheres, particles, mesh, gratings, etc. The relative number density of the structural material and the protective material can vary. For example, the wall of the housing at a given location can be 90% structural material and 10% protective material. In other implementations, there can be up to 20%, 30%, 50%, 75%, or 95% protective material suspended in the structural material.

Metallic Protective Material

In some implementations, the structural material of the housing can be made of plastic while the protective material can be of generally metallic composition. For example, the protective material can be a metal or foil layer applied to a surface of the structural material. The metallic protective material can be significantly thinner than the structural material. Metallic protective materials can include, for example, adhesive-backed foil, metal plating, or sheet metal secured to the structural material.

In some implementations, the protective material can be adhesive-backed foil. The adhesive-backed foil can be a thin metal layer, such as copper, tin, aluminum, or steel, with an adhesive backing. The adhesive-backed foil can be cut or otherwise shaped to cover regions of the structural material that could possibly be penetrated by the reflected laser light. Adhesive-backed foil is generally inexpensive and can have a metallic layer that is sufficient to absorb and/or scatter the reflected laser light that strikes it. Adhesive backed foil can be cut or shaped to cover any desired surface or be replaced if damaged or worn. The thickness of the adhesive-backed foil can vary depending on the amount of laser energy to be dissipated, scattered, absorbed, etc. The adhesive-backed foil can have a metal layer of approximately, for example, 0.5, 1.0, 1.2, 1.5, 2.0, or 2.5 thousandths of an inch in thickness. The thickness of the protective material whether a foil, plating, or additive can be any of these values and can vary from location to location. Also, other thicknesses can be implemented that are sufficient to absorb or reflect the laser energy without significant damage to the protective surface. In other implementations, the heat conduction or reflection of the absorbed or reflected laser light can be sufficient to maintain the temperature of the protective material below a melting point of the protective material.

In other implementations, a plate of stamped metal can be manufactured and affixed in a permanent, semi-permanent, and/or detachable manner to the housing with fasteners, for example, screws, bolts, adhesive, etc. Also, a coating of chrome and/or other metal can be plated or deposited. The deposition coating can be by spraying, painting, or immersion. In some implementations, the deposition coating can contain a substrate with metallic particulates suspended within the substrate.

Protective material can be introduced as an additive to the structural material during an injection-molding process used to manufacture the housing. For example, aluminum, zinc, steel, tungsten, nickel, and lead. In some implementations, the protective material can be constructed as a grid, mesh, screen, honeycomb, or the like and incorporated either within the structural material (optionally with the structural material acting as a fill) or placed on an exposed surface of the structural material (whether on an internal or external surface). Another implementation can be to include the protective material as an "in-mold decoration." Here, the protective material can be applied to a carrier material in the mold. When the structural material is introduced to the mold, the protective material can adhere to the structural material and remain with the structural material when the housing is removed from the mold. In this way, the structural material can be chemically bonded to the structural material without the need for fasteners.

Non-Metallic Protective Material

The protective (or structural) materials can also be of a non-metallic composition. For example, the protective material can be sheets of glass, ceramic, heat-resistant plastic, silicone, vinyl, wood, and/or the like. Other examples of non-metallic protective materials can include metalloids such as carbon, boron, silicon, calcium carbonate, talc, and barium.

The exposed interior surface (whether of structural material as shown in FIG. 6 or protective material as in FIG. 5) can be generally reflective or glossy to allow laser energy to reflect at a lower power density (as shown in FIG. 3). In other implementations, the exposed interior surface can be matte to allow more of the laser energy to be absorbed (as shown in FIG. 2).

According to various implementations of the current subject matter, a CNC machine can include a light source and a housing. The light source can be configured to deliver electromagnetic energy at a location of a plurality of locations on a material at least partially disposed within the CNC machine. The housing can include at least one side part surrounding an interior space the housing and the at least one location on the material. The housing can include a structural material defining at least a portion of the interior space. The housing can further include a protective material protecting the side part. The protective material can reduce a permeability of the side part to the electromagnetic radiation relative to the structural material alone.

The housing can further include a bottom part of the CNC machine. The protective material can further reduce a permeability of the bottom part to the electromagnetic radiation relative to the structural material alone.

The protective material can include at least one of adhesive-backed metallic foil, metallic plating, a ceramic particle layer, a metallic particle layer, and/or a plastic layer that is more resistant to electromagnetic radiation than the structural material. The protective material can be disposed on an inner surface of the structural material. The protective material can be disposed on an outer surface of the structural material. The protective material can be disposed within the structural material. The protective material can be disposed between an external structural material and an internal structural material.

The protective material can include a metallic layer. The protective material can include a ceramic layer. The structure material can include plastic. The protective material can be detachable and/or semi-detachable. The protective material can be more resistant to the electromagnetic energy than the structural material.

The light source can include a laser. The laser can be capable of one or more of discoloring, ablating, and vaporize the material. The CNC machine can be capable of hardening, creating a phase transition, and/or modifying the physical characteristics of the material.

The light source can include a carbon dioxide laser. The electromagnetic energy can include infrared radiation.

The at least one side part can encloses at least half of the interior space of the housing.

According to various implementations of the current subject matter, a method for manufacturing a computer-numerically-controlled machine can include defining at least a portion of a side part with a structural material. The side part can be protected with a protective material. The protective material can reduce a permeability of the side part to electromagnetic radiation relative to the structural material alone. The housing can be formed to include the side part, which includes the structural material and the protective material. A light source can be configured to deliver the electromagnetic radiation to a material that is at least partially disposed within the housing.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-numerically-controlled machine comprising:
    a laser configured to deliver laser energy to at least one location on a material within an interior space of the computer-numerically-controlled machine; and
    a housing comprising an openable barrier and at least one side part that form an enclosure when the openable barrier is in a closed position, the enclosure surrounding the interior space of the computer-numerically-controlled machine, the housing comprising:
        a structural material forming the at least one side part of the housing, wherein at most a first non-zero amount of laser energy from the laser is capable of being reflected to a first area on an inside surface of the structural material, and wherein at most a second non-zero amount of laser energy from the laser is capable of being reflected to a second area on the inside surface of the structural material; and
        a protective material applied to the first area and not the second area based on (i) the first non-zero amount of laser energy being sufficient to penetrate the structural material at the first area and (ii) the second non-zero amount of laser energy being insufficient to penetrate the structural material at the second area.

2. The computer-numerically-controlled machine of claim 1, wherein the housing further comprises a bottom part of the computer-numerically-controlled machine, wherein the structural material additionally forms the bottom part, and wherein the protective material is further applied to the bottom part, thereby reducing a permeability of the bottom part to electromagnetic radiation relative to the structural material alone.

3. The computer-numerically-controlled machine of claim 2, wherein the protective material applied to the bottom part of the computer-numerically-controlled machine is disposed on a third area on the inside surface of the structural material.

4. The computer-numerically-controlled machine of claim 1, wherein the protective material comprises at least one of a ceramic particle layer, a metallic particle layer, or a plastic layer that is more resistant to electromagnetic radiation than the structural material.

5. The computer-numerically-controlled machine of claim 1, wherein the protective material comprises a metallic layer.

6. The computer-numerically-controlled machine of claim 1, wherein the protective material comprises a ceramic layer.

7. The computer-numerically-controlled machine of claim 1, wherein the protective material comprises plastic.

8. The computer-numerically-controlled machine of claim 1, wherein the protective material is detachable or semi-detachable.

9. The computer-numerically-controlled machine of claim 1, wherein the protective material is more resistant to electromagnetic radiation than the structural material.

10. The computer-numerically-controlled machine of claim 1, wherein the laser is capable of one or more of discoloring, ablating, or vaporizing the material.

11. The computer-numerically-controlled machine of claim 1, wherein the computer-numerically-controlled machine is capable of one or more of hardening, creating a phase transition, or modifying one or more physical characteristics of the material.

12. The computer-numerically-controlled machine of claim 1, wherein the laser comprises a carbon dioxide laser, and the laser energy comprises infrared radiation.

13. The computer-numerically-controlled machine of claim 1, wherein the at least one side part encloses at least half of the interior space of the housing.

14. The computer-numerically-controlled machine of claim 1, wherein the protective material is thinner than the structural material to which it is applied.

15. The computer-numerically-controlled machine of claim 1, wherein the protective material comprises an adhesive-backed metallic foil.

16. The computer-numerically-controlled machine of claim 1, wherein the protective material comprises a metal layer having a thickness between 0.5 and 2.5 thousandths of an inch.

17. The computer-numerically-controlled machine of claim 1, further comprising a focusing lens through which the laser energy passes before striking the material.

18. The computer-numerically-controlled machine of claim 17, wherein the first non-zero amount of laser energy capable of being reflected to the first area on the inside surface of the structural material is based on (i) a first path length between the focusing lens and the first area and (ii) a first maximum power density of the laser energy from the laser capable of being delivered over the first path length as the laser energy spreads out with increasing distance from the focusing lens; and wherein the second non-zero amount of laser energy capable of being reflected to the second area on the inside surface of the structural material is based on (i) a second path length between the focusing lens and the second area and (ii) a second maximum power density of the laser energy from the laser capable of being delivered over the second path length as the laser energy spreads out with increasing distance from the focusing lens.

19. The computer-numerically-controlled machine of claim 1, wherein the protective material is diffusively reflective.

20. A method for manufacturing a computer-numerically-controlled machine comprising a laser configured to deliver laser energy to at least one location on a material within an interior space of the computer-numerically-controlled machine, the method comprising:

defining, with a structural material, at least a portion of a side part of a housing of the computer-numerically-controlled machine, wherein at most a first non-zero amount of laser energy from the laser is capable of being reflected to a first area on an inside surface of the structural material, and wherein at most a second non-zero amount of laser energy from the laser is capable of being reflected to a second area on the inside surface of the structural material;

applying a protective material to the first area and not the second area based on (i) the first non-zero amount of laser energy being sufficient to penetrate the structural material at the first area and (ii) the second non-zero amount of laser energy being insufficient to penetrate the structural material at the second area; and forming the housing comprising the side part and an openable barrier that form an enclosure when the openable barrier is in a closed position, the enclosure surrounding the interior space of the computer-numerically-controlled machine, the side part including the structural material and the protective material.

\* \* \* \* \*